United States Patent [19]

Cunningham et al.

[11] 4,083,490
[45] Apr. 11, 1978

[54] SOLAR SUPPLEMENTAL HEATING SYSTEM

[76] Inventors: John Joseph Cunningham, Box 180, Schuylerville, N.Y. 12871; Martin Jeffrey Welch, 16 Underwood Dr., Saratoga, N.Y. 12866; Henry Francis Puppolo, 218 Corinth St., North Adams, Mass. 01247

[21] Appl. No.: 661,643

[22] Filed: Feb. 26, 1976

[51] Int. Cl.² ............................................. F24J 3/02
[52] U.S. Cl. .................................... 237/1 A; 126/271; 165/106
[58] Field of Search ............... 237/1 A; 126/270, 271; 165/106

[56] References Cited

U.S. PATENT DOCUMENTS

| | | | |
|---|---|---|---|
| 1,742,861 | 1/1930 | Johnson | 126/271 |
| 2,342,211 | 2/1944 | Newton | 126/271 |
| 2,460,482 | 2/1949 | Abbot | 126/271 |
| 2,544,474 | 3/1951 | Swanton, Jr. | 126/271 |
| 2,553,302 | 5/1951 | Cornwall | 126/271 |
| 3,107,052 | 10/1963 | Garrison | 126/271 |
| 3,799,145 | 3/1974 | Butterfield | 126/271 |
| 3,859,980 | 1/1975 | Crawford | 126/271 |
| 3,863,621 | 2/1975 | Schoenfelder | 126/270 |
| 3,908,632 | 9/1975 | Poulsen | 126/271 |
| 3,918,430 | 11/1975 | Stout et al. | 126/271 |
| 3,939,819 | 2/1976 | Minardi | 126/271 |
| 3,981,295 | 9/1976 | Minnick | 126/271 |
| 4,003,367 | 1/1977 | Wikholm | 126/271 |

*Primary Examiner*—John J. Camby
*Assistant Examiner*—Henry C. Yuen

[57] ABSTRACT

A compact and economical supplemental home heating system utilizes a colloidal suspension of finely divided graphite particles as the collection medium. The emitter of the system is closely spaced from the collector so as to reduce complexity and cost of the system itself, as well as to facilitate inexpensive installation into existing dwellings.

4 Claims, 2 Drawing Figures

SOLAR SUPPLEMENTAL HEATING SYSTEM

BACKGROUND OF THE INVENTION

This invention relates to solar supplemental heating systems, and more particularly to such systems of high efficiency and low cost.

The present crisis in the cost and availability of fossil fuels for heating has brought about increased activity in efforts to convert solar energy into controllable heat for buildings and industry. Much of the effort has been directed to complex systems that are intended to provide all or substantial portions of the heat requirements of the user. It appears to be accepted within this rapidly growing art that massive storage of the sun's energy during the daylight hours is a necessity if uniform heating during the dark hours is to be obtained. However, such complexity moves the benefits of solar heat beyond the budget of the average home owner, who is the very person most hurt by the inflationary rise in home heating costs.

Prior art solar energy collectors traditionally employ solid radiant energy absorbing surfaces to convert radiant energy into heat. These surfaces operate on the black body principle, by absorbing energy and transfering the absorbed energy by conduction to a fluid collector medium (usually air or water) which then transmits this energy to a heat sink from which it must be recaptured for use by elaborate procedures.

It is an object of this invention to provide a solar supplemental heating system of low cost and high efficiency.

It is another object to provide a solar supplemental heating system in a compact package that permits ready accommodation into existing dwellings.

SUMMARY OF THE INVENTION

In general, the solar supplemental heating system of this invention provides a compact collector and storage-emitter package for insertion between the standard stud spacing of domestic dwelling construction. High efficiency of collection and distribution of the solar energy is achieved by employing a colloidal suspension of finely divided black bodies as the collecting medium.

The compactness of this system enables the use of small and low cost pumps and controls which themselves conserve energy by using very little electricity, thereby also saving operating expense for the user.

DRAWING DESCRIPTION

DESCRIPTION OF THE INVENTION

Figure 2:
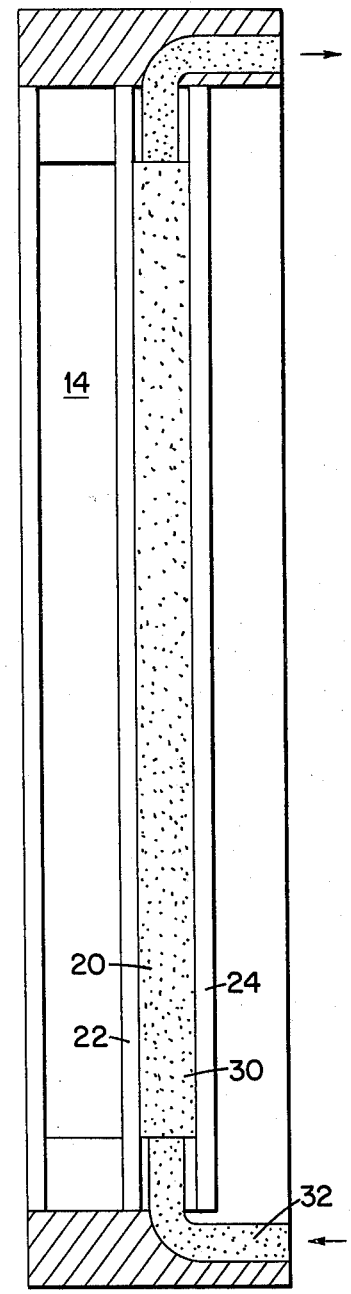
FIG. 2 is a cross-section of a side view of the collector of FIG. 1.

The solar supplemental heating system of this invention reduces the demands placed on the primary heat source of a dwelling by providing a compact construction that yields about 10° to 15° F of the required comfort heat during the daylight hours and continues to yield lesser heat long after sundown. Because of the low construction cost of the system of this invention, the low installation cost, and the low operating cost, this system provides the user with a saving in the operation of his primary fossil fuel system.

The collector employed in the system of this invention totally eliminates the intermediate step of the prior art systems by eliminating the necessity for heat transfer from a black body collector to a collecting medium. Our collector uses a fluid medium capable of absorbing significant amounts of radiant energy directly by means of a colloidal suspension of finely divided black bodies, e.g., particles of carbon or graphite.

Energy absorption and efficiency of the collector are dependent upon the amount of energy absorbed by the collecting medium. This amount is maximized by choosing a medium which absorbs as much as possible of the radiant energy available to the collector. The absorbing substance is pumped through channels exposed to the radiant energy source. Since the system employs no step relying primarily upon conduction, the transfer radiant energy to the collecting medium is assumed to be instantaneous. Energy loss is then confined to: (1) radiant energy reflected from the collector; (2) radiant collection medium; and (3) heat loss in the transfer of the collection fluid to the heat sink.

These losses can be minimized by choosing materials designed to direct the radiant energy as efficiently as possible to the collection medium and then to the heat sink. The smaller the spacing between collector and emitter and the faster the fluid flows to the heat sink, the less the energy loss to the system.

In the operation of the system of this invention, the collector absorbs the sun's rays in an absorbent medium of ethylene glycol, water and a colloidal suspension of graphite (Aquadag). Ethylene glycol is the preferred carrier fluid because of its viscosity (20.5–21.0 cps at 25° C) and its well-known antifreeze property over a wide fluid range between freezing and boiling (60% in water freezes at about −50° C). However, other antifreeze materials are suitable for this invention, provided they produce a suspending medium for the black bodies. A specific example of a collector medium for this invention is one part of 4% of colloidal graphite in water (Aquadag) and five parts ethylene glycol, which mixture has a viscosity of 14 to 15.5 cps at 25° C. Particles of about 1 micron in size are preferred, in that smaller particles tend to pack and limit the penetration of the radiant energy.

This collector medium is heated in the collector section and is circulated into the storage-emitter section. The cycle is controlled by a photosensitive control which operates a check valve and a pump. This cycle allows the storage section to increase in temperature during the sunlight hours of the day. The heat stored is circulated through a radiator (fin type) by conventional controls (thermostat and pump). The heat stored is sufficient to supplement a heat system by 10° to 15° F, thereby preventing the continuous cycling of the main heating system, which consumes more energy as the number of cycles increase.

As shown in the two figures of the drawing, the system 10 employs a collector 20 constructed of plexiglass. The exposed side (outside of the house) is made similar to a cathode ray tube with a safety plate 12, in the sense of being a sandwiched construction without the use of adhesive, but mechanically supported at the edges. This provision of an air space 14 offers insulation that prevents cooling of the collecting medium 30 and main body 20 of the collector.

Collector 20 includes an outer transparent member 22 of a high thermal conductivity (i.e., absorbs very little of the heat from the sun) such as plastic or glass. Outer member 22 and shield 12 are preferably of the same material. The rear member 24 of collector 20 has a highly reflective surface, such as a mirror, to concentrate the heat within the medium 30, rather than absorb heat.

As shown in FIG. 2, the collector medium 30 provides a high concentration of suspended finely divided black particles. The use of the black colloidal suspension 30 increases the thermal absorption by a factor of at least nine over a black fluid without particles. It is necessary only to make the suspension of a proper viscosity to circulate freely. The preferred material graphite further contributes to the system by acting as a lubricant in the pumping systems, thereby improving the mechanical operation of the pump systems.

In specific examples of the system of this invention, it was established that the volume of the storage or emitter section 40 should be five times the collector 20 volume. A collector inside dimensions 33 × 12 × ⅜ inch whose volume is approximately 150 cubic inches provides enough heat to a storage section five times the volume (755 cu. in.) to supplement one room 18 × 10 × 8 feet from 55° to 68° F all day with outdoor temperatures averaging 55° F. The length of radiated fins 80 used is 40 inches comprising aluminum fins 3 × 2 inches on a 0.750 inch copper tube.

The storage section or emitter must be insulated as at 44 in the construction except for portable units for windows that will be provided with insulation.

Pump 50 is used to circulate the medium 30 from the collector 20 to the emitter 40. Rather than have pump 50 operate when the sun is not striking the collector, a photoswitch 52 is provided so as to activate pump 50 when the advantage of circulating medium 30 is present. Additional pump 60 enhances the circulation of medium 30 from emitter 40 to radiator 70 which is located preferably just inside the wall which supports system 10 of this invention. A thermostat 62 is provided to limit operation of pump 60 to times of demand for heat.

An important feature of this system is the reduction of any losses as the distance from the collector to emitter is governed by wall thicknesses. Short lengths of conduits 32 and 42 for connecting collector 20 to storage 40 and from storage 40 to the radiator 70 section increase the efficiency of our solar heating system.

Significant advantages are provided in our system by construction of the collector with the back 24 of the fluid channels 20 mirrored. The nature of our energy collecting surface is such that it may be directly transferred to the heat sink. The collecting medium moves across the collector, heat loss is minimized, and radiant energy is reflected back into the collecting medium. Use of a particulate suspension will also greatly increase the effective surface area of the collector in most applications.

Modifications of the foregoing construction include the use of pressurized collectors whereby the collecting medium is maintained under pressure from the collector to the storage emitter to the radiator. Although the collector of the drawing is depicted as a rigid construction, it should be understood that flexible collectors of plastic are within the spirit and scope of this invention. Flexible collectors offer the advantage of portability to the sunny side of a house during the course of the day, and also offer ease of storage. Flexible piping to a fixed storage-emitter between the studs of the room to be heated further facilitates use of a collector that can be moved to follow the sun.

Figure 1:
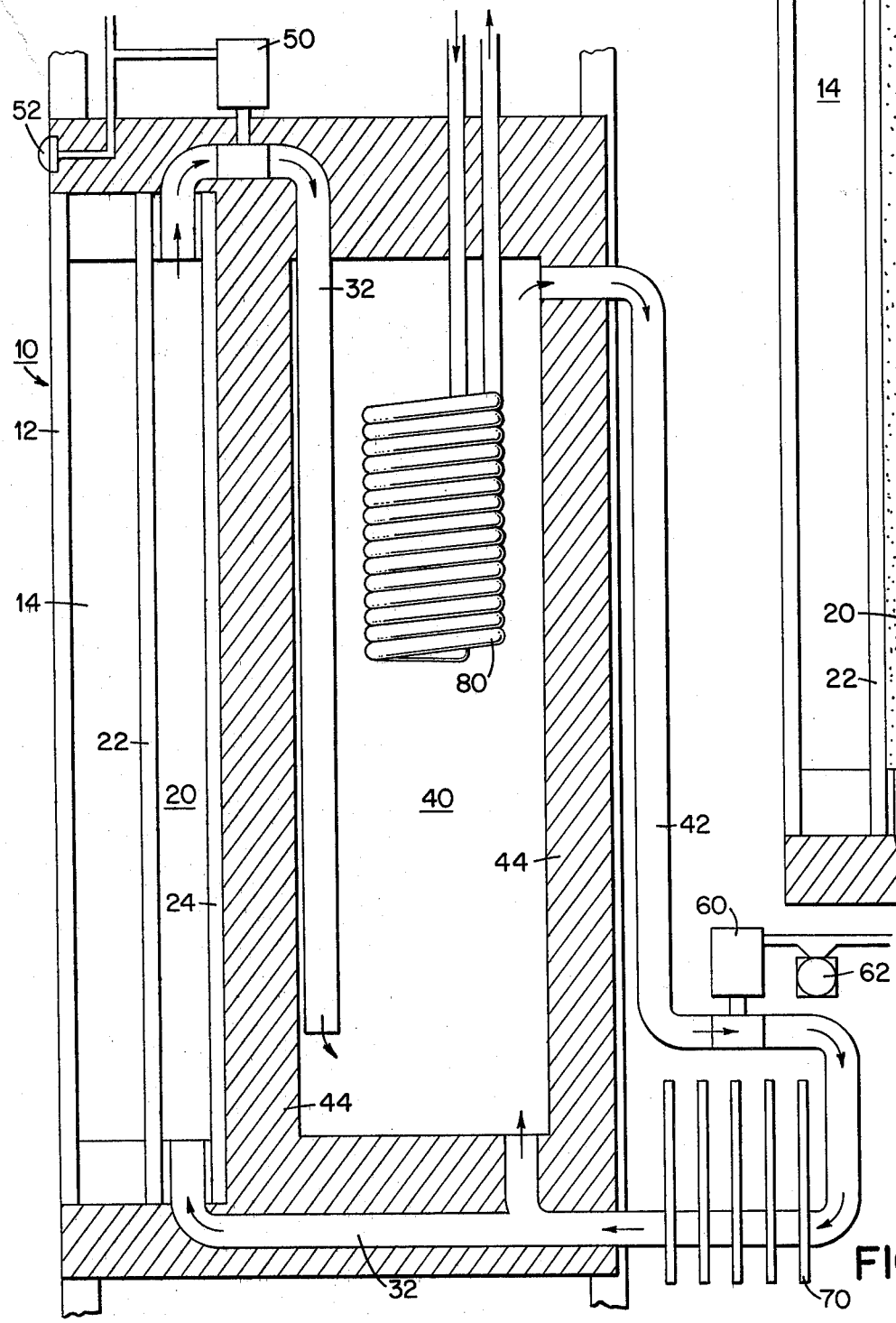
FIG. 1 is a diagramatic cross-section of the system of this invention.

We have found that this system is capable of supporting an auxiliary heat exchanger within the emitter 40 without substantially reducing the temperature of the emitter. FIG. 1 shows a heat exchange coil 80 within emitter 40 to serve as a domestic hot water heater. Alternatively, coil 80 could employ a low boiling material, e.g. the Freons, so as to develop pressure within a closed system to perform work, such as air conditioning or the like.

What is claimed is:

1. A solar supplemental heating system for insertion between the standard stud spacing of domestic dwelling construction, comprising an integral package of a solar heat collector having a width to fill said stud spacing, said collector having an outer transparent face member having a high thermal conductivity, said collector having a rear member having a reflective surface, said collector having an inlet and outlet, a heat storage-emitter of said width located directly behind said collector and spaced therefrom in said package by insulation, said heat storage-emitter having first inlet and first outlet, said storage-emitter being about five times the volume of said collector, conduits connecting the inlet and outlet of said storage-emitter to the outlet and inlet respectively of said collector, said conduits running through said insulation at the top and bottom of said package, a radiator connected to a second inlet and a second outlet of said storage-emitter, a heat collecting fluid medium including a colloidal suspension of finely divided graphite particles in a fluid having a wide fluid temperature range, and means to circulate said medium through said collector, storage-emitter, and radiator by drawing said medium under pressure from said collector to said storage-emitter.

2. The solar supplemental heating system of claim 1 wherein said means includes a photosensitive controlled valve between said collector and said storage-emitter to circulate said medium upon impingement of sunlight.

3. The solar supplemental heating system of claim 1 wherein said means includes a thermostatically controlled pump to circulate said medium between said storage-emitter and said radiator upon demand.

4. The solar supplemental heating system of claim 1 wherein said medium is one part of 4% colloidal graphite in water and five parts ethylene glycol.

* * * * *